United States Patent
Donley et al.

(10) Patent No.: US 7,940,702 B1
(45) Date of Patent: May 10, 2011

(54) METHOD AND APPARATUS FOR ALLOWING COMMUNICATION WITHIN A GROUP

(75) Inventors: Christopher J. Donley, Broomfield, CO (US); Torbert G. Shipley, Niwot, CO (US)

(73) Assignee: Avaya Inc., Basking Ridge, NJ (US)

( * ) Notice: Subject to any disclaimer, the term of this patent is extended or adjusted under 35 U.S.C. 154(b) by 1629 days.

(21) Appl. No.: 11/233,759

(22) Filed: Sep. 23, 2005

(51) Int. Cl.
*H04L 12/16* (2006.01)
(52) U.S. Cl. ................ 370/260; 379/202.01
(58) Field of Classification Search .......... 370/260; 379/158, 202.01
See application file for complete search history.

(56) References Cited

U.S. PATENT DOCUMENTS

| | | | | |
|---|---|---|---|---|
| 6,661,886 | B1* | 12/2003 | Huart et al. | 379/215.01 |
| 7,013,155 | B1* | 3/2006 | Ruf et al. | 455/466 |
| 7,245,707 | B1* | 7/2007 | Chan | 379/88.17 |
| 7,283,620 | B2* | 10/2007 | Adamczyk | 379/88.13 |
| 7,305,438 | B2* | 12/2007 | Christensen et al. | 709/205 |
| 7,317,788 | B2* | 1/2008 | Caspi et al. | 379/88.13 |
| 7,418,090 | B2* | 8/2008 | Reding et al. | 379/202.01 |
| 2002/0073142 | A1* | 6/2002 | Moran | 709/203 |
| 2002/0077082 | A1* | 6/2002 | Cruickshank | 455/413 |
| 2004/0047461 | A1* | 3/2004 | Weisman et al. | 379/202.01 |
| 2004/0076272 | A1* | 4/2004 | Zafar et al. | 379/88.13 |
| 2004/0081295 | A1* | 4/2004 | Brown et al. | 379/88.13 |
| 2005/0043951 | A1* | 2/2005 | Schurter | 704/270.1 |
| 2005/0136896 | A1* | 6/2005 | Ward et al. | 455/413 |
| 2005/0210394 | A1* | 9/2005 | Crandall et al. | 715/752 |
| 2005/0232166 | A1* | 10/2005 | Nierhaus | 370/260 |
| 2007/0033250 | A1* | 2/2007 | Levin et al. | 709/204 |

* cited by examiner

*Primary Examiner* — William J Deane
(74) *Attorney, Agent, or Firm* — John C. Moran

(57) ABSTRACT

A method and apparatus exchange information within a predefined group of telecommunication terminals with each of the group being utilized by a user by forming a voice message by one of the group; communicating the voice message to the remainder of the group via instant message communication; and converting the instant message communication to a voice conferencing communication that includes all members of the group that remained part of the instant message communication.

10 Claims, 3 Drawing Sheets

METHOD AND APPARATUS FOR ALLOWING COMMUNICATION WITHIN A GROUP

TECHNICAL FIELD

This invention relates to communication and messaging systems.

BACKGROUND

Due to increased Internet bandwidth to the home, environmental considerations, and economic factors, more and more people are starting to work at home rather than to go into a more traditional work place. This trend cuts across a variety of industries and governmental entities. Whereas, working at home does allow the individual to avoid commuting and to have a larger and quieter work space, an individual who works at home does not have the group experience. In a more traditional office environment where a number of people sit in close proximity, an individual having a question can simply voice the question in a short voice expression and get an immediate response from the group. An individual working at home can set up a conference call to all of the individuals in the group who are remote and ask the same question, but this is a time consuming process.

The other alternative that can be utilized is to send an instant message to the group. The disadvantaged of the instant message is that it requires the individual to type the question and then for people to respond with a written answer. It is well known that for short questions most people prefer to hear the question and respond vocally.

SUMMARY

A method and apparatus exchange information within a predefined group of telecommunication terminals with each of the group being utilized by a user by forming a voice message by one of the group; communicating the voice message to the remainder of the group via instant message communication; and converting the instant message communication to a voice conferencing communication that includes all members of the group that remained part of the instant message communication.

DETAILED DESCRIPTION

In one embodiment, an individual wishing to ask a question of a predefined group transmits an instant message that utilizes a voice message rather than a text message. Each individual of the group can then respond to the instant message or chose to drop off of a session created by the instant message. The responses from the individuals of the group are transmitted to all members of the group who are still active on the session. At a later point, any active individual of the group can convert the instant message session into a voice conference call.

Figure 1:
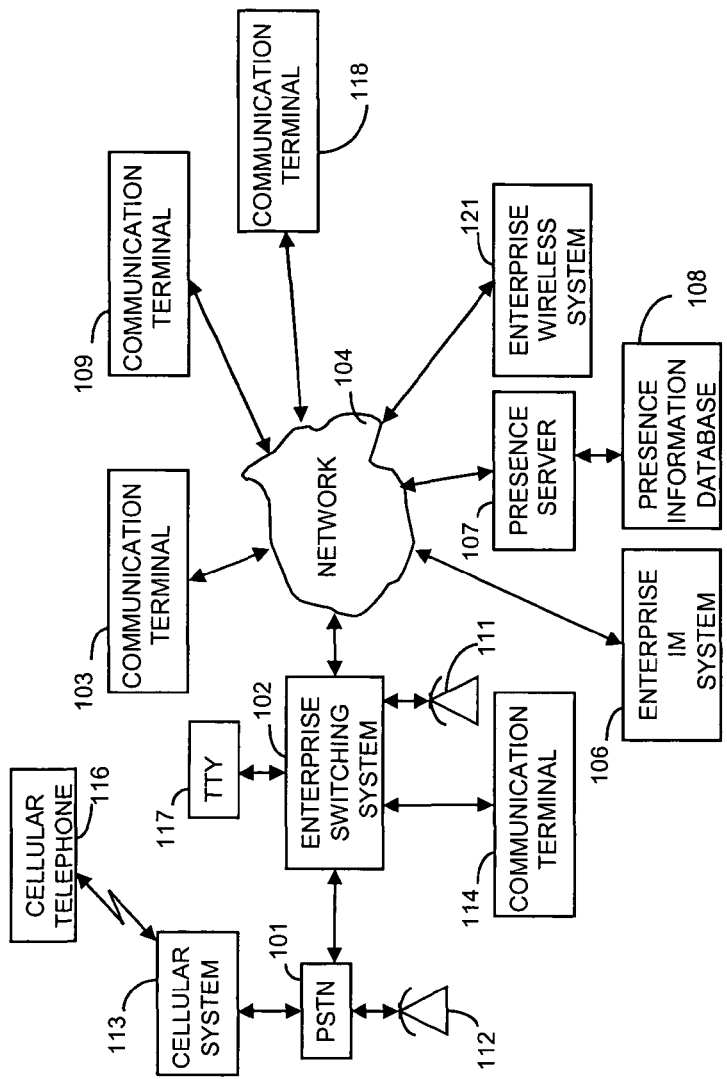
FIG. 1 illustrates, in block diagram form, an embodiment of system.

FIG. 1 illustrates an embodiment. Public switched telephone network 101 interconnects communication devices such as telephone 112 to enterprise switching system 102. Enterprise switching system 102 provides voice and other types of media communication capabilities for communication terminal 114, telephone 116 and TTY terminal 117. One skilled in the art would realize that there could be a plurality of each of these types of devices. Enterprise switching system 102 thus allows a telephone such as telephone 116 to place a call to a telephone connected to the public switched telephone network 101.

Further, enterprise switching system 102 not only allows a communication terminal such as communication terminal 114 to place voice calls, but also access to IM messages via enterprise IM system 106. In addition, a communication terminal such as communication terminal 114 may also gain access to the switching network 104.

Further, communication terminals 103, 106, and 118 are interconnected via switching network 104 to enterprise switching system 102. In addition, enterprise wireless system 121 also provides wireless service normally within a geographic location of an entity.

Enterprise IM system 106 provides a secure IM communication means for users within an entity. Communication terminals 103, 109, and 114 may be geographically dispersed even though they are considered as being part of the enterprise entity.

A user assigned to enterprise switching system 102 may be present on cellular system 119, public switched telephone network 101, enterprise IM system 106, and enterprise wireless system 121. Presence server 107 may be used to receive information concerning on which IM system the user is present, and this information may be stored in presence information database 108. The operations of these systems with respect to user's presence is detailed in U.S. Patent Application Publication 2004/0141594 which is hereby incorporated by reference.

To understand the embodiment illustrated in FIG. 1, consider the following example. Communication terminals 103, 109, 114, and 118 are in a predefined group. Assume that the user of communication terminal 114 has a question which they wish to pose to the other users of the group. The user activates the voice message operation by actuation of one or more keys or curser selections on communication terminal 114. The user then records a short message. After the message is recorded, communication terminal 114 sends this voice message to communication terminals 103, 109, and 118. Advantageously, the message may be sent in an invite message of the session initiation protocol (SIP). SIP is defined in the Internet Engineering Task Force (IETF) Request for Comments (RFC) 3261 "SIP: Session Initiation Protocol", June, 2002. The short voice message is included in proprietary fields of the invite message.

Whether the message is actually outputted on communication terminals 103, 109, or 118 depends if these terminals are present on network 104, the user has not specified that they wish not to receive such messages at the present time, or the communication terminal is currently performing operations during which it is unadvisable to play a message. One such operation would be if the user of the communication terminal was engaged in an active voice call.

Assume for the example that the user of communication terminal 118 does not wish to respond or be part of any answers concerning the questions it has received. The user terminates the session created by the invite message by striking a particular key, cursor selection, or voice command. Communication terminal 118 then terminates the session, and the proper messages are transmitted back to the other communication terminals of the group.

The users of communication terminals 103 and 109 do respond and may do so simply by speaking their response when the communication terminals are capable of recognizing the onset of voice. Also, in another embodiment, the users of the communication terminals will strike a key to indicate that they are going to record a message. When the message is recorded, it is transmitted to communication terminal 114 and the other communication terminals who are still active on the session. Assume for the sake of the example, that communication terminal 103 transmits a remark or response and the user of communication terminal 109 decides not to respond but to remain part of the session. The response from communication terminal 103 may advantageously be transmitted again in another invite message to communication terminals 114 and 109. The communication terminals 103, 109, and 114 can continue to transmit back and forth these recorded messages or any of the communication terminals can convert the session into an actual voice call by transmitting a re-invite message requesting that a RTP stream be established using standard SIP protocol to communicate the conference call that is now established between communication terminals 103, 109, and 114.

In the previous example, if communication terminal 114 determines that the user of say communication terminal 118 is not present on communication terminal 118 but rather is present on cellular telephone 116, the initial message will be transmitted to cellular telephone 116. Similarly, if a user present on enterprise wireless system 121 as determined by presence server 107, the messages will be transferred to the user on enterprise wireless system 121. Further, it is possible for a user to be utilizing TTY terminal 117 in which case, enterprise switching system 102 will translate the voice message to the text protocol of a TTY terminal.

Figure 2:
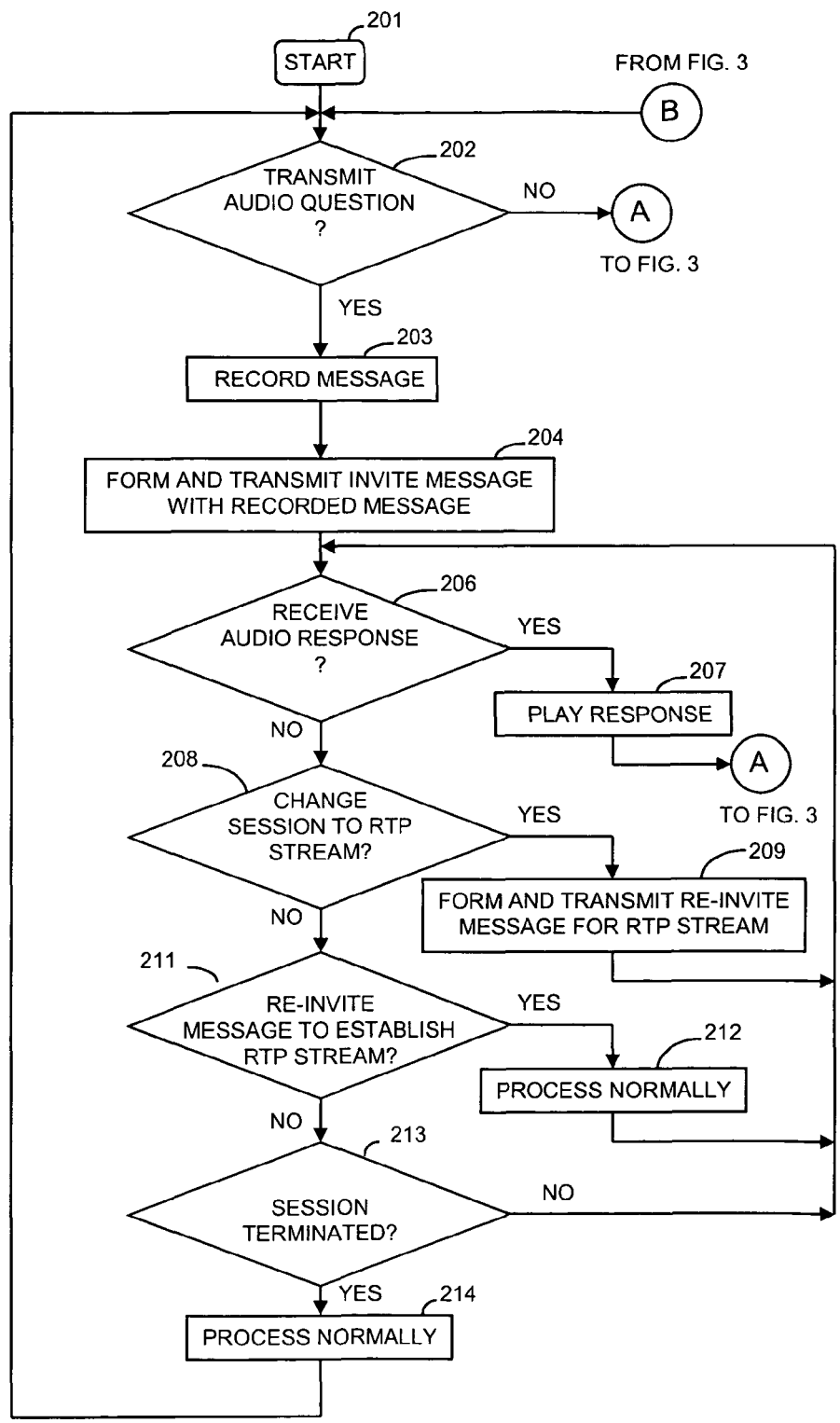
FIGS. 2 and 3 illustrate, in flowchart form, operations performed by communication terminals in one embodiment.
Figure 3:
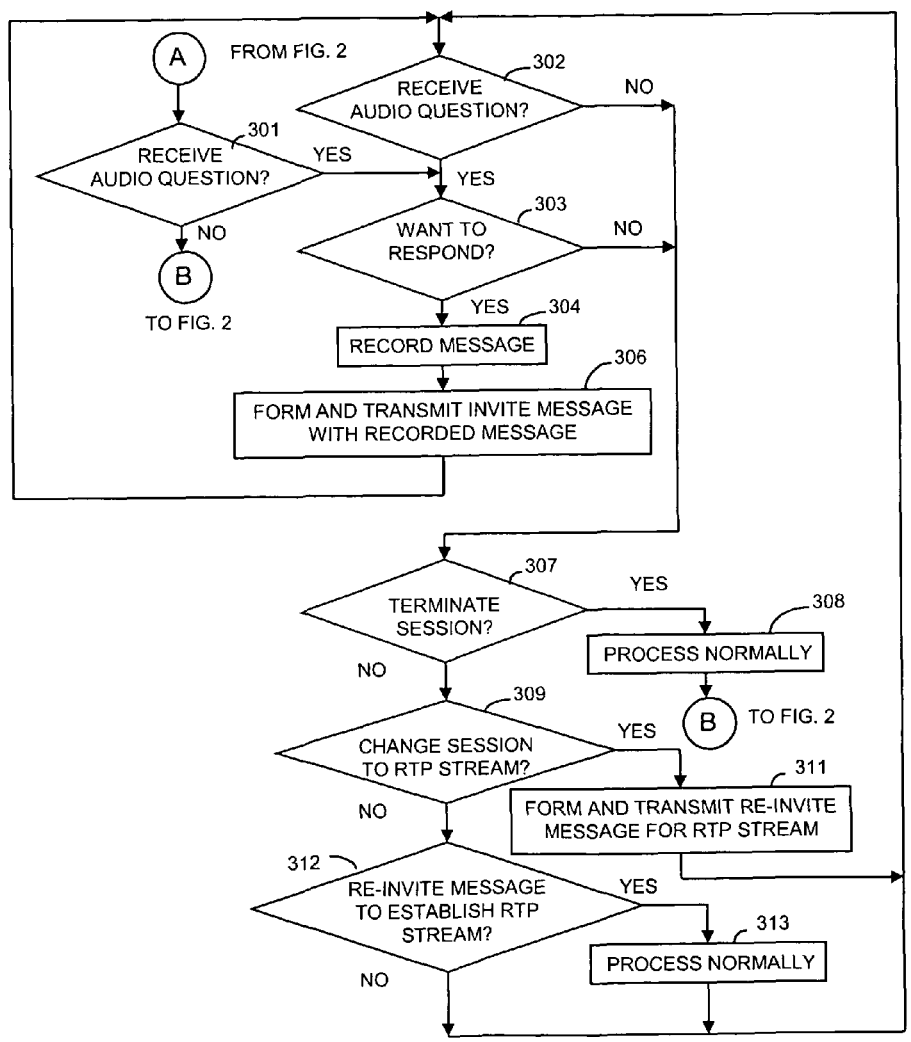

FIGS. 2 and 3 illustrate, in flowchart form, operations performed by communication terminals in one embodiment. After being started in block 201, decision block 202 determines if the user of the terminal has indicated that they want to transmit an audio question. If the answer is yes, block 203 records the message, and block 204 forms and transmits an invite message with the recorded message in proprietary fields.

After execution of block 204, decision block 206 determines if a response had been received back to the audio question. If the answer is yes, block 207 plays the response before transferring control back to decision block 301 of FIG. 3.

If the answer in decision block 206 is no, decision block 208 determines if the user of the terminal wishes to transfer to voice communication via a conference call by establishing a RTP stream. If the answer is yes, block 209 forms and transmits a re-invite message for a RTP stream before transferring control back to decision block 206.

If the answer in decision block 208 is no, decision block 211 determines if a re-invite message has been received as part of the session to establish a RTP stream so that a conference call can take place. If the answer is yes, block 212 performs normal processing in response to the re-invite message before transferring control back to decision block 206.

If the answer in decision block 211 is no, decision block 213 determines if the session that was established by the transmission of the audio question has been terminated. If the answer is no, control is transferred back to decision block 206. If the answer is yes in decision block 213, block 214 performs normal processing before transferring control back to decision block 202.

Returning to decision block 202, if the answer in decision block 202 is no, control is transferred decision block 301. The latter decision block determines if an audio question has been received in an invite message. If the answer is no, control is returned to decision block 202 of FIG. 2. If the answer is yes in decision block 301, control is transferred to decision block 303.

Decision block 303 determines if the user wants to respond and if the audio question is coming from the proper group. The user may indicate they want to respond to the audio question by a keystroke or voice command. Also, the user may predefine that the audio question is to be refused when the user is actively engaged in a voice call. Further, the user can define situations under which no response will be given to the audio question using a software agent executing rules predefined by the user or by presence rules entered into a presence server such as presence server 107. If the answer is no in decision block 303, control is transferred to decision block 307.

If the answer is yes in decision block 303, block 304 records a message and block 306 forms and transmits an invite message with the recorded message before returning control to decision block 302.

If the answer is no in either decision block 302 or 303, decision block 307 determines if the session has been terminated. If the answer is yes, block 308 processes this normally before returning control back to decision block 202 of FIG. 2.

If the answer in decision block 307 is yes, block 309 determines if the user of the terminal wishes to change the session to an RTP stream so as to establish a voice conference call. If the answer is yes, block 311 forms and transmits a re-invite message for a RTP stream before returning control back to decision block 302.

If the answer in decision block 309 is no, decision block 312 determines whether a re-invite message has been received to establish a RTP stream. If the answer is yes, block 313 performs normal processing before transferring control back to decision block 302. If the answer in decision block 312 is no, control is transferred back to decision block 302.

When the operations of a control computer, telecommunication terminal or server are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The control computer, telecommunication terminal or server can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance, via optical scanning of the paper or other medium, then compiled, interpreted or otherwise processed in a suitable manner if necessary, and then stored in a computer memory.

In an alternative embodiment, where a control computer, telecommunication terminal or server is implemented in hardware, control computer, telecommunication terminal or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for exchanging information within a predefined group of telecommunication terminals with each of the predefined group of telecommunication terminals being utilized by a user, comprising:
    forming voice information into a first SIP invite message by a first one of the predefined group of telecommunication terminals wherein the predefined group of telecommunication terminals comprises more than two telecommunication terminals;
    communicating by first one of the predefined group of telecommunication terminals the first SIP invite message to other ones of the predefined group of telecommunication terminals;
    presenting the voice information in the first SIP invite message by each one of the other ones of the predefined group of telecommunication terminals upon reception of the first invite message;
    forming other voice information into a second SIP invite message by a second one of the predefined group of telecommunication terminals;
    communicating by a second one of the predefined group of telecommunication terminals the second SIP invite message to other ones of the predefined group of telecommunication terminals;
    presenting the other voice information in the second SIP invite message by each one of the other ones of the predefined group of telecommunication terminals upon reception of the second SIP invite message;
    transmitting a SIP re-invite message by the first one of the predefined group of telecommunication terminals to other ones of the predefined group of telecommunication terminals to establish a RTP stream in response to the user of the first one of the predefined group of telecommunication terminals requesting that the first one of the predefined group of telecommunication terminals establish a voice conference call with other ones of the predefined group of telecommunication terminals ; and
    establishing a RTP stream by ones of the predefined group of telecommunication terminals in response to transmission of the SIP re-invite message resulting in ones of the predefined group of telecommunication terminals becoming part of a voice conference call.

2. The method of claim 1 further comprises refusing to join the predefined group of telecommunication terminals via SIP invite message communication by another one of the predefined group of telecommunication terminals if the other one of the group is in a state that does not allow convenient communication of the voice message to the user of the other one of the predefined group of telecommunication terminals.

3. The method of claim 2 wherein the refusing is performed upon the other one of the predefined group of telecommunication terminals being engaged in a telecommunication call.

4. The method of claim 2 wherein the refusing is controlled by presence rules entered into a presence server.

5. The method of claim 2 wherein the refusing is controlled by rules predefined by the user to the other one of the predefined group of telecommunication terminals.

6. A non-transitory computer readable medium for exchanging information within a predefined group of telecommunication terminals with each of the predefined group of telecommunication terminals being utilized by a user, comprising non-transitory computer executable instructions configured for:
    forming voice information into a first SIP invite message by a first one of the predefined group of telecommunication terminals wherein the predefined group of telecommunication terminals comprises more than two telecommunication terminals;
    communicating by first one of the predefined group of telecommunication terminals the first SIP invite message to other ones of the predefined group of telecommunication terminals;
    presenting the voice information in the first SIP invite message by each one of the other ones of the predefined group of telecommunication terminals upon reception of the first invite message;
    forming other voice information into a second SIP invite message by a second one of the predefined group of telecommunication terminals;
    communicating by a second one of the predefined group of telecommunication terminals the second SIP invite message to other ones of the predefined group of telecommunication terminals;
    presenting the other voice information in the second SIP invite message by each one of the other ones of the predefined group of telecommunication terminals upon reception of the second SIP invite message;
    transmitting a SIP re-invite message by the first one of the predefined group of telecommunication terminals to other ones of the predefined group of telecommunication terminals to establish a RTP stream in response to the user of the first one of the predefined group of telecommunication terminals requesting that the first one of the predefined group of telecommunication terminals establish a voice conference call with other ones of the predefined group of telecommunication terminals; and
    establishing a RTP stream by ones of the predefined group of telecommunication terminals in response to transmission of the SIP re-invite message resulting in ones of the predefined group of telecommunication terminals becoming part of a voice conference call.

7. The non-transitory computer readable medium of claim 6 further comprises non-transitory computer executable instructions for refusing to join the predefined group of telecommunication terminals via SIP invite message communication by another one of the predefined group of telecommunication terminals if the other one of the group is in a state that does not allow convenient communication of the voice message to the user of the other one of the predefined group of telecommunication terminals.

8. The non-transitory computer readable medium of claim 7 wherein the non-transitory computer executable instructions for refusing are performed upon the other one of the predefined group of telecommunication terminals being engaged in a telecommunication call.

9. The non-transitory computer readable medium of claim 7 wherein the non-transitory computer executable instructions for refusing are controlled by presence rules entered into a presence server.

10. The non-transitory computer processor-readable medium of claim 7 wherein the non-transitory computer executable instructions for refusing are controlled by rules predefined by the user to the other one of the predefined group of telecommunication terminals.

\* \* \* \* \*